(12) United States Patent
He et al.

(10) Patent No.: US 8,429,717 B2
(45) Date of Patent: Apr. 23, 2013

(54) METHOD FOR ACTIVATING VIRTUAL MACHINE, APPARATUS FOR SIMULATING COMPUTING DEVICE AND SUPERVISING DEVICE

(75) Inventors: Le He, Beijing (CN); Xing Jin, Beijing (CN); Qingbo Wang, Beijing (CN); Yang Zhao, Beijing (CN); Zhi Le Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 12/624,650

(22) Filed: Nov. 24, 2009

(65) Prior Publication Data
US 2010/0138898 A1   Jun. 3, 2010

(30) Foreign Application Priority Data

Nov. 28, 2008   (CN) .......................... 2008 1 0180166

(51) Int. Cl.
*G06F 21/00* (2006.01)
(52) U.S. Cl.
USPC ................... 726/3; 726/4; 709/220; 709/221; 709/222; 713/186
(58) Field of Classification Search .................. 726/3–4; 718/1; 725/15; 709/22, 220–222; 711/6; 712/228–229; 703/3; 713/186
See application file for complete search history.

(56) References Cited

U.S. PATENT DOCUMENTS

| | | | | |
|---|---|---|---|---|
| 4,253,145 A | * | 2/1981 | Goldberg | 703/21 |
| 5,095,522 A | * | 3/1992 | Fujita et al. | 719/316 |
| 5,165,018 A | * | 11/1992 | Simor | 709/222 |
| 5,708,838 A | * | 1/1998 | Robinson | 709/202 |
| 5,774,721 A | * | 6/1998 | Robinson | 719/315 |
| 6,934,945 B1 | * | 8/2005 | Ogilvy | 718/1 |
| 7,197,561 B1 | * | 3/2007 | Lovy et al. | 709/224 |
| 7,870,301 B2 | * | 1/2011 | Arndt et al. | 710/8 |
| 7,975,017 B1 | * | 7/2011 | Kuzkin et al. | 709/208 |
| 2002/0069369 A1 | * | 6/2002 | Tremain | 713/201 |
| 2003/0221023 A1 | * | 11/2003 | Peddada et al. | 709/330 |

(Continued)

FOREIGN PATENT DOCUMENTS

CN   101071463   11/2007

OTHER PUBLICATIONS

AmpleStor, Direct Storage Server (DSS), 2003.*

(Continued)

*Primary Examiner* — Andy Rao
*Assistant Examiner* — Shan Elahi
(74) *Attorney, Agent, or Firm* — Cantor Colburn LLP; Preston Young (57) ABSTRACT

A method for activating a virtual machine, an apparatus for simulating a computing device and a device for supervising activation of the apparatus. The method includes: activating a network interface of the virtual machine, and activating other components of the virtual machine, where the network interface of the virtual machine is capable of communicating with the outside world so activation of the other components of the virtual machine can be supervised. The simulation apparatus includes a network interface and an operating system having a security sub-system, where the network interface is configured to be first activated during activation of the simulation apparatus so the network interface can communicate with the outside world, and activation of the other components of the apparatus can be supervised during the activation of the other components of the apparatus.

19 Claims, 7 Drawing Sheets

U.S. PATENT DOCUMENTS

| | | | | |
|---|---|---|---|---|
| 2004/0172574 A1* | 9/2004 | Wing et al. | ......................... | 714/4 |
| 2006/0294519 A1* | 12/2006 | Hattori et al. | ...................... | 718/1 |
| 2007/0079307 A1* | 4/2007 | Dhawan et al. | .................... | 718/1 |
| 2007/0179955 A1* | 8/2007 | Croft et al. | ......................... | 707/9 |
| 2009/0070335 A1* | 3/2009 | Cozianu et al. | ................. | 707/10 |
| 2009/0199177 A1* | 8/2009 | Edwards et al. | ................. | 718/1 |
| 2010/0058335 A1* | 3/2010 | Weber | ............................... | 718/1 |
| 2010/0107162 A1* | 4/2010 | Edwards et al. | ................. | 718/1 |

OTHER PUBLICATIONS

CISCO, Catalyst 6500 Virtual Switching 1440: Reduce Operating Expenditures, Protect and Enhance Investment, 1997-2007.*

Espacenet Search, Espacenet Result List, Sep. 2011.*

Virtual_honeywall 2004, Installing a virtual honeywall using VMware, 2004.*

Vitual Networking Concept, VMware Virtual Networking Concept, 2007.*

Raj et al, "Enabling Semantic Communications for Virtual Machines via iConnect", Dec. 2007.* http://www.amplestor.com/view_sercats.php?nSctId=8.

CISCO, Solution Overview, "Catalyst 6500 Virtual Switching 1440: Reduce Operating Expenditures, Protect and Enhance Investment", 1992-2007, pp. 1-9.

XenServer Administrator's Guide, Mar. 2008, pp. 1-102 http://support.citrix.com/servlet/KbServlet/download/16460-102-18187/reference-4.1.0-1.0-en_gb.pdf.

* cited by examiner

METHOD FOR ACTIVATING VIRTUAL MACHINE, APPARATUS FOR SIMULATING COMPUTING DEVICE AND SUPERVISING DEVICE

CROSS REFERENCE TO RELATED APPLICATION

This application claims priority under 35 U.S.C. 119 from Chinese Patent Application 200810180166.0, filed Nov. 28, 2008, the entire contents of which are incorporated herein by reference.

BACKGROUND OF THE INVENTION

1. Field of the Invention

The present invention relates to virtual machines. More particularly, it relates to communication of a virtual machine with the outside to enable real time supervision of activation of the virtual machine.

2. Description of Related Art

Virtualization refers to a process in which a set of hardware is virtualized into sets of hardware on a computer hardware platform in a software or hardware approach and provided as separately operating environments to a plurality of separately operating software systems (typically operating systems, e.g., Window 98, Window 2000, Windows XP, Linux, Unix, Mac, etc.), and such a separately operating environment is commonly referred to a Virtual Machine (VM). A plurality of separate operating systems can be run in parallel on a virtualization-enabled computer device.

These operating systems are independent from one another except for sharing hardware resources (e.g., memories, input and output devices, etc.) when they are operative and thus can be taken as a plurality of separating computer in operation. Generally, a virtualization-enabled computer is used to run operating systems and application software systems functioning differently.

Currently, virtualization is at the forward position of the era and can aid enterprises in updating and managing and also secure their worldwide IT infrastructures. In the coming years, virtual machines will not be limited to simple deployment of resources or the use as a computer room any longer, but they will also provide an elementary constructive block so as to improve mobility, security and availability of desktops.

A virtual machine typically includes the entire operative environment consisting of a virtual hardware, an operating system, a middleware, an application program, etc., and thus can provide a simple, uniform and easy-to-use interface to thereby facilitate convenient deployment of services.

A virtual machine can be deployed in various environments. The virtual machine shall be configured during activation thereof. Parameters for configuring the virtual machine may exist internal or external to the virtual machine and shall be provided to the virtual machine in the latter case. Currently, there are two primary methods for providing a virtual machine with configuration parameters to activate the virtual machine.

A first method involves the use of a privileged console of a virtual machine hypervisor. For convenience, a physical machine where the virtual machine is located, an operating system of the physical machine and an application module for managing the virtual machine are referred to collectively as a virtual machine hypervisor which typically provides a privileged console through which a user logs in the virtual machine. The privileged console is usable when a network of virtual machines is unavailable or deactivated. A drawback of this method is the absence of universality because the privileged console is bound with the virtual machine hypervisor and a virtual machine logging-in interface provided by the privileged console is also dependent upon the specific virtual machine hypervisor. Thus, a user has to manually log in and configure the virtual machine, which may be difficult to grasp and troublesome for the user.

A second method involves the use of a virtual floppy disk or CD-ROM in which information required for activation of a virtual machine is stored. Upon activation of the virtual machine, an activation engine in the virtual machine traverses installed disks and locates an activation profile in the virtual floppy disk or virtual CD-ROM and then makes use of parameters in the activation profile during activation of the virtual machine. A drawback of the second method lies in a required ability of the virtual machine to identify a format of the virtual floppy disk or virtual CD-ROM and to take the activation profile therefrom. Furthermore, it is impossible to supervise activation of the virtual machine through the virtual floppy disk or CD-ROM.

SUMMARY OF THE INVENTION

According to a first aspect of the present invention, there is provided a method for activating a virtual machine. The method includes the steps of activating a network interface of the virtual machine and activating other components of the virtual machine, wherein the network interface is configured to communicate outside of the virtual machine so that activation of the other components of the virtual machine can be supervised.

According to another aspect of the present invention, simulation apparatus for simulating a computing device includes: an operating system having a security sub-system; and a network interface configured to be first activated during activation of the simulation apparatus so that the first network interface is capable of communicating outside of the simulation apparatus so that activation of other components of the apparatus can be supervised during the activation of other components of the apparatus.

BRIEF DESCRIPTION OF THE DRAWINGS

Objects, features and advantages of the present invention will become more readily apparent with reference to the following description of the embodments thereof taken in conjunction with the drawings in which.

DETAILED DESCRIPTION OF THE PREFERRED EMBODIMENT

The life cycle of a virtual machine involves phases of creation, deployment, activation, operation, etc. With the present invention, it is possible to supervise in real time the entire procedure of activating the virtual machine system, which involves supervision of whether configuration of virtual hardware and software is proper, the status of the virtual machine system (e.g., a usage ratio of a CPU and a memory, a network communication condition of a process, etc.), an activation progress, etc., during activation. A deployment person or a revision enabled deployment server, once obtaining such information, can modify in a timely way some activation parameters during activation upon determining abnormality to thereby enable smooth completion of activation. Also a developer or tester can debug activation through real time supervision in the creation phase of the virtual machine to thereby discovery any problem as early as possible, which will result in a substantially improved efficiency of development.

Figure 1:
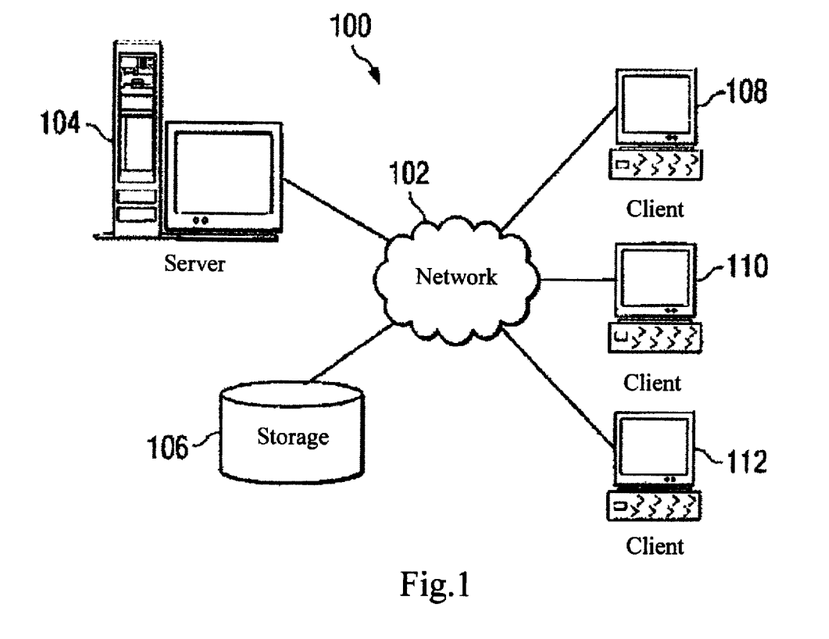
FIG. 1 illustrates a distributed data processing system with which the present invention can be practiced.

Reference is now made to FIG. 1 to describe a distributed data processing system 100 with which the present invention can be practiced. The distributed data processing system 100 includes a network 102 which is a medium for provision of communication links between computers interconnected in the distributed data processing system 100.

In the illustrated example, both a server 104 and storage 106 are connected with the network 102 to which clients 108, 110 and 112 are also connected. The distributed data processing system 100 may include additional servers, clients and other devices not illustrated. In the illustrated example, the distributed data processing system 100 is the Internet, and the network 102 represents a set of networks and gateways in mutual communication through the TCP/IP protocol suite. Of course, the distributed data processing system 100 can alternatively be embodied as a different type of network.

FIG. 1 is only illustrative. The system illustrated in FIG. 1 can be modified variously without departing from the spirit and scope of the present invention.

The present invention can be embodied as a data processing system of the server 104 illustrated in FIG. 1. The data processing system can be a Symmetric Multi-Processor (SMP) system including a plurality of processors connected to a system bus. Alternatively, a single-processor system can be used. Alternatively, the present invention can be embodied as a data processing system of the client in FIG. 1.

Figure 2:
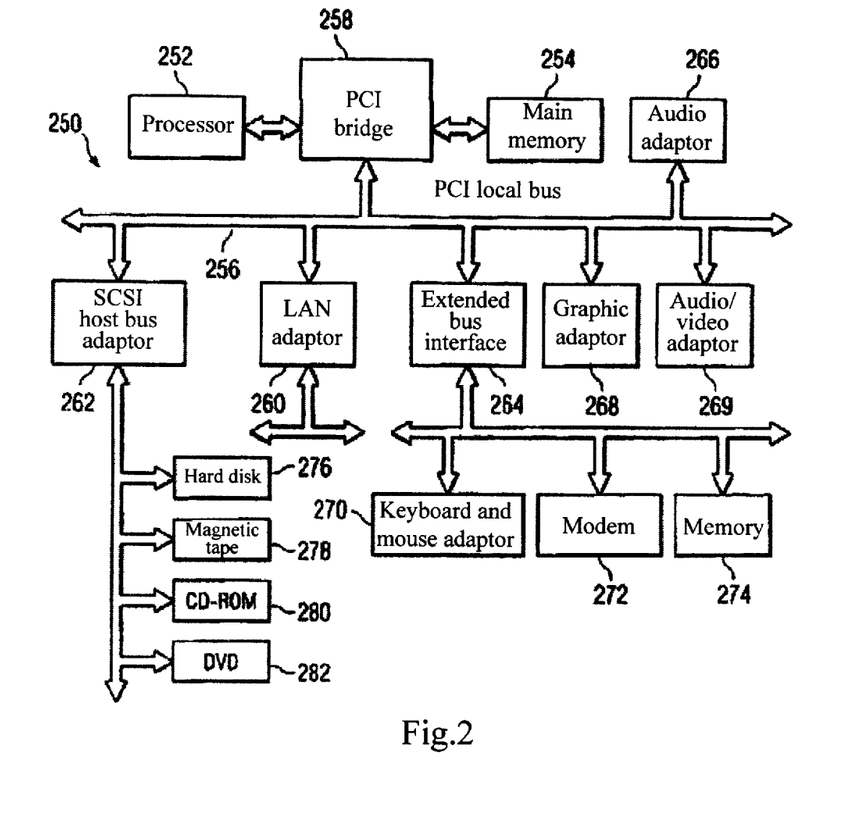
FIG. 2 illustrates a data processing system with which the present invention can be practiced.

Reference is now made to FIG. 2 to illustrate a block diagram of a data processing system with which the present invention can be practiced. A data processing system 250 is an example of a client computer. The data processing system 250 uses Peripheral Component Interconnection (PCI) local bus architecture. Although the PCI bus is used as the illustrative example, other bus architectures, e.g., micro channels, ISA, etc., can also be used. A processor 252 and a main memory 254 are connected to the PCI local bus 256 through a PCI bridge 258. For the processor 252, the PCI bridge 258 can also include an integrated memory controller and high-speed buffer. Additional connections to the PCI local bus 256 can be enabled through component interconnection or a built-in board.

In the illustrated example, a Local Area Network (LAN) adaptor 260, an SCSI host bus adaptor 262 and an extended bus interface 264 are connected to the PCI local bus 256 through component connections. In contrast, an audio adaptor 266, a graphic adaptor 268 and an audio/video (A/V) adaptor 269 are connected to the PCI local bus 256 through an in-built board inserted into extension slots. The extended bus interface 264 provides connections for a keyboard and mouse adaptor 270, a modem 272 and an additional memory 274. In the illustrated example, the SCSI host bus adaptor 262 provides connections for a hard disk 276, a magnetic tape 278, a CD-ROM 280 and a DVD 282. A typical implementation of the PCI local bus can support three or four PCI extension slots or in-built connectors.

Figure 3:
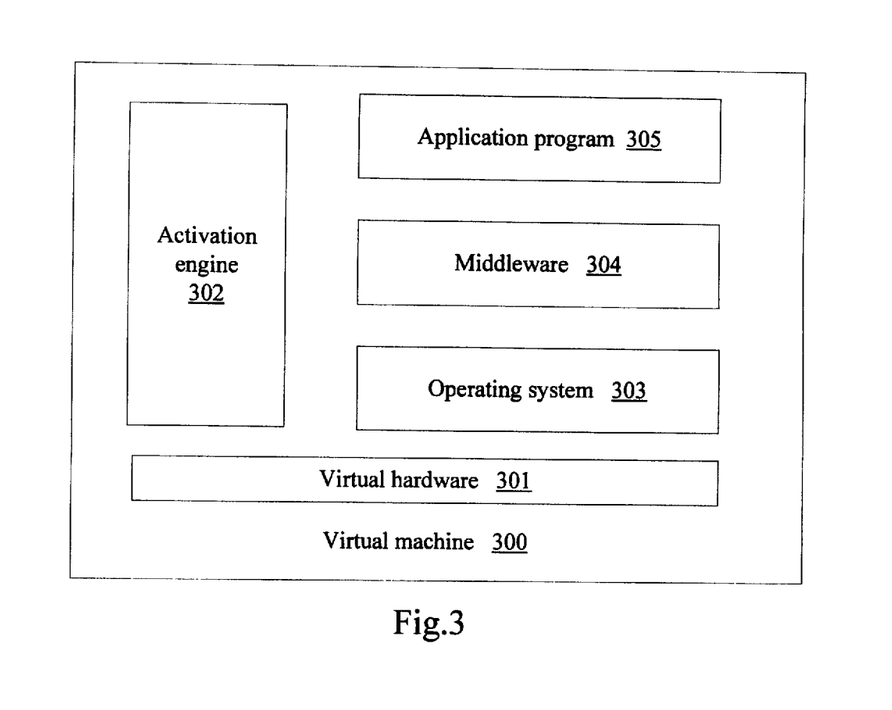
FIG. 3 illustrates an architecture of a virtual machine in the prior art.

FIG. 3 illustrates an architecture of a virtual machine in the prior art. A virtual machine 300 includes virtual hardware 301, an activation engine 302, an operating system 303, a middleware 304 and an application program 305. The virtual machine shall be activated prior to initial operation thereof, that is, the respective components of the virtual machine shall be configured. Activation of the virtual machine will typically be required only once for the respective components and will not be required any longer upon subsequent operation of the virtual machine. The activation engine 302 is adapted to configure the other components of the virtual machine 300, that is, to activate the other components of the virtual machine 300, during activation. It is unnecessary to configure and hence to activate the activation engine 302 itself. Generally, the activation engine 302 starts automatically to operate upon activation.

Figure 4:
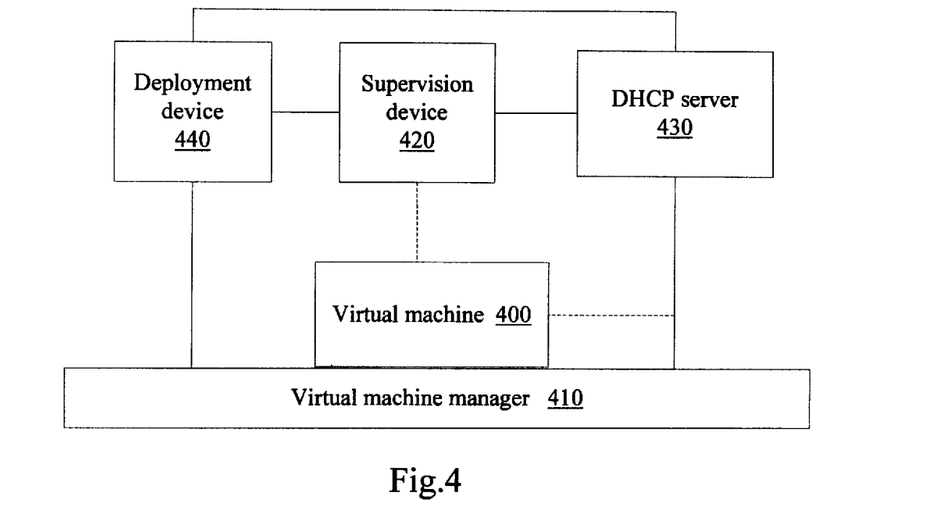
FIG. 4 illustrates a virtual machine environment according to an embodiment of the present invention.

FIG. 4 is a schematic diagram of a virtual machine environment according to an embodiment of the present invention. In the virtual machine environment of FIG. 4, a deployment device 440 connected with a virtual machine hypervisor 410 is adapted to deploy a virtual machine 400 on a virtual machine hypervisor 410 which can provide the virtual machine 400 with physical hardware resources, e.g., a memory, input and output devices. A supervision device 420 is adapted to supervise activation of the virtual machine 400. A Dynamic Host Configuration Protocol (DHCP) server 430 is connected with the virtual machine hypervisor 410, the supervision device 420 and the deployment device 440. The DHCP server 430 can allocate dynamically IP address to the virtual machine hypervisor 410, the supervision device 420, the deployment device 440 and the virtual machine 400. The supervision device 420 can be connected with the deployment device 440 to obtain information on the virtual machine 400 from the deployment device 440. In FIG. 4, the virtual machine 400 is connected with the supervision device 420 and the DHCP server 430 through broken lines, which indicates that the virtual machine 400 can communicate with the supervision device 420 and the DHCP server 430 only after a network function of the virtual machine is activated. In an embodiment, the supervision device 420 and the deployment device 440 can be the same device.

Figure 5:
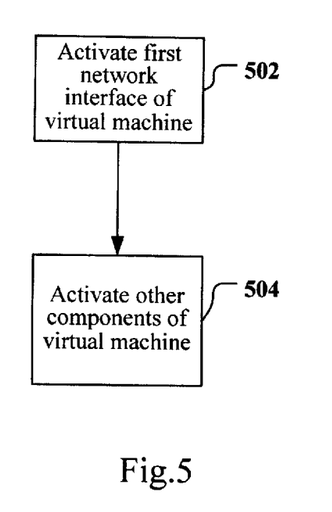
FIG. 5 is a flow chart of a method for activating a virtual machine according to an embodiment of the present invention.

FIG. 5 is a flow chart of a method for activating a virtual machine according to an embodiment of the present invention.

The virtual machine has been deployed on the virtual machine hypervisor prior to activation of the virtual machine. The virtual machine can be deployed on the virtual machine hypervisor by different ways. For example, the virtual machine can be deployed on the virtual machine hypervisor through the deployment device. Alternatively, the virtual machine can be copied to the virtual machine hypervisor through a removable storage medium, e.g., a floppy disk, a CD-ROM, etc.

In step 502, a first network interface of the virtual machine is activated. A user can input an activation command through the input device of the virtual machine hypervisor or issue an activation command by controlling remotely the virtual machine hypervisor. In an embodiment, the first network interface of the virtual machine is preset with the highest activation priority and thus will be first activated upon reception of a command to activate the virtual machine.

In step 504, other components of the virtual machine are activated, so the first network interface of the virtual machine can communicate with the outside of the virtual machine so that activation of the other components of the virtual machine can be supervised. The other components of the virtual machine refer to the virtual hardware, the operating system, the middleware, the application program, etc, except the first network interface of the virtual machine. The operating system includes a security sub-system, a file sub-system, etc. The security sub-system is provided with an authorization and verification mechanism to thereby guarantee the security of communication, which is well known to those skilled in the art and therefore will not be detailed here. Since the first network interface of the virtual machine is activated before the security sub-system of the operating system, the first network interface of the virtual machine is limited to communication with only one or several trustable devices, e.g., the supervision device, etc., for security in an embodiment. For example, the network interface of the virtual machine can communicate with the trustable devices by a special authentication file (e.g., an asymmetric key, etc.) to thereby guarantee the security of communication. In this embodiment, the first network interface of the virtual machine will not expose any Application Program Interface (API) to the upper application program except for communication with the above trustable devices. That is, no program of the application layer (e.g., IE, MSN, etc.) can invoke the first network interface for communication with the outside.

There are many ways to allow the virtual machine to communicate with the trustable device. The following description is presented by way of the supervision device as an example of the trustable device. The supervision device can be provided with a communication means for communication with the virtual machine. In an embodiment, the virtual machine when being deployed on the virtual machine hypervisor is additionally provided with a configuration file in which a MAC address of the first network interface of the virtual machine is recorded. The MAC address can be specified by the user or generated automatically by the deployment device. In step 502, the MAC address is read from the configuration file as the MAC address of the first network interface of the virtual machine upon activation of the first network interface of the virtual machine. The first network interface of the virtual machine requests the DHCP server for allocation of an IP address thereto by broadcasting its MAC address. The DHCP server records a correspondence relationship between the IP address and the MAC address after allocation of the IP address to the first network interface of the virtual machine. In step 504, the supervision device can know from the deployment device the MAC address of the virtual machine to be supervised and query the DHCP server with the MAC address of the first network interface of the virtual machine to obtain the IP address of the first network interface of the virtual machine. The supervision device can communicate with the first network interface of the virtual machine after obtaining the IP address of the first network interface of the virtual machine.

In another embodiment, step 502 is the same as that in the above embodiment. In step 504, the supervision device can obtain from the deployment device the MAC address of the virtual machine to be supervised and obtain the IP address of the first network interface of the virtual machine through broadcasting an ARP (Address Resolution Protocol) request carrying the MAC address of the first network interface of the virtual machine.

In a further embodiment, the IP address of the first network interface of the virtual machine can be specified by the user or the configuration server and recorded in the configuration file. Thus in step 502, the IP address is read from the configuration file as the IP address of the first network interface of the virtual machine upon activation of the first network interface of the virtual machine.

In another embodiment, the above configuration file may include an IP address of the supervision device. The first network interface of the virtual machine can communicate with the supervision device by the IP address of the supervision device included in the configuration file after obtaining the IP address of the virtual machine itself. This embodiment can also be applied to the case where the virtual machine is deployed on the virtual machine hypervisor through a removable storage medium instead of the deployment device.

Those skilled in the art can enable communication between the virtual machine and the supervision device in light of the above description, and therefore implementation details thereof will not be described here.

In an embodiment, the virtual machine can receive information required for activation, e.g., a specific parameter for an application program, from the outside via the first network interface in step 504. The virtual machine can also receive a command, for example, to view a log, to list processes and ports, to view an activation progress, etc., from the outside via the first network interface. The virtual machine can also transmit periodically a report on the activation to the outside. The virtual machine can also transmit initiatively information during the activation, e.g., error information, etc., to the outside via the first network interface. For example, if a standard library file is absent during the activation, then the error information can be transmitted to the outside, and the standard library file can be received from the outside to thereby accomplish the activation. For example, the virtual machine may communicate with an external supervision device which may include a communication means and a control means. The control means of the supervision device can transmit the information required for the activation to the virtual machine and/or receive the information during the activation from the virtual machine through the communication means. The supervision device can be the same device as the deployment device.

In an embodiment, a virtual floppy disk or virtual CD-ROM in the prior art can also be utilized. In this embodiment, the virtual machine when being deployed on the virtual machine hypervisor is additionally provided with the virtual floppy disk or virtual CD-ROM. In step 504, the activation engine in the virtual machine traverses the installed virtual disks and locates an activation profile in the virtual floppy disk or virtual CD-ROM, and then reads parameters in the activation profile. It is not necessary to obtain parameters required for activation from the outside through the first network interface of the virtual machine if they can be obtained from the activation profile.

Figure 6:
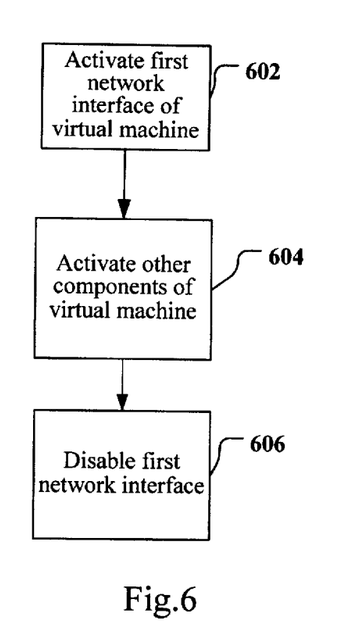
FIG. 6 is a flow chart of a method for activating a virtual machine according to another embodiment of the present invention.

FIG. 6 is a flow chart of a method for activating a virtual machine according to another embodiment of the present invention. In FIG. 6, steps 602 and 604 are similar to the steps 502 and 502 in FIG. 5 and therefore description thereof is omitted here. Subsequent to step 604, the first network interface is disabled after the other components of the virtual machine are activated. A command can be transmitted from the deployment device to disable the first network interface or the first network interface can be disabled automatically by the activation engine of the virtual machine.

Figure 7:
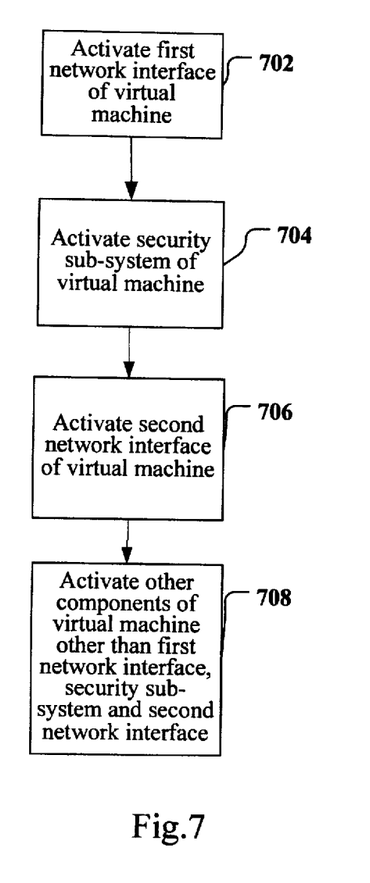
FIG. 7 is a flow chart of a method for activating a virtual machine according to still another embodiment of the present invention.

FIG. 7 is a flow chart of a method for activating a virtual machine according to still another embodiment of the present invention. In FIG. 7, step 702 is similar to step 502 in FIG. 5 and therefore redundant description thereof is omitted here. In step 704, the security sub-system of the virtual machine is activated. In step 706, a second network interface of the virtual machine is activated after the security sub-system of the virtual machine is activated. In step 708, the components of the virtual machine other than the first network interface, the security sub-system and the second network interface are activated.

The second network interface of the virtual machine has the same function as a conventional network interface of the virtual machine, and is not limited to communication with only the trustable devices as the first network interface. In this embodiment, step 706 is executed subsequent to step 704. However, step 708 is not limited to be executed subsequent to step 706. Those skilled in the art can choose to execute step 708 prior to step 704 or subsequent to step 706, between steps 704 and 706, partially prior to step 704 and partially subsequent to step 706, etc in different circumstance.

Figure 8:
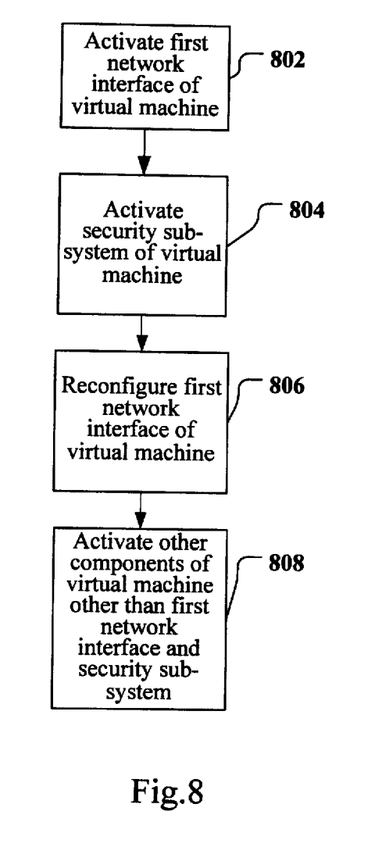
FIG. 8 is a flow chart of a method for activating a virtual machine according to a further embodiment of the present invention.

FIG. 8 is a flow chart of a method for activating a virtual machine according to a further embodiment of the present invention. In FIG. 8, steps 802 and 804 are similar to steps 702 and 704 in FIG. 7 and therefore redundant description thereof is omitted here. In step 806, the first network interface of the virtual machine is reconfigured after the security sub-system of the virtual machine is activated to cancel the limitation thereof to communication with only the trustable devices, that is, to enable it to function as a conventional network interface of the virtual machine. In step 808, the components of the virtual machine other than the first network interface and the security sub-system are activated. Like step 708 in FIG. 7, step 808 is not limited to be executed subsequent to the step 806.

Figure 9:
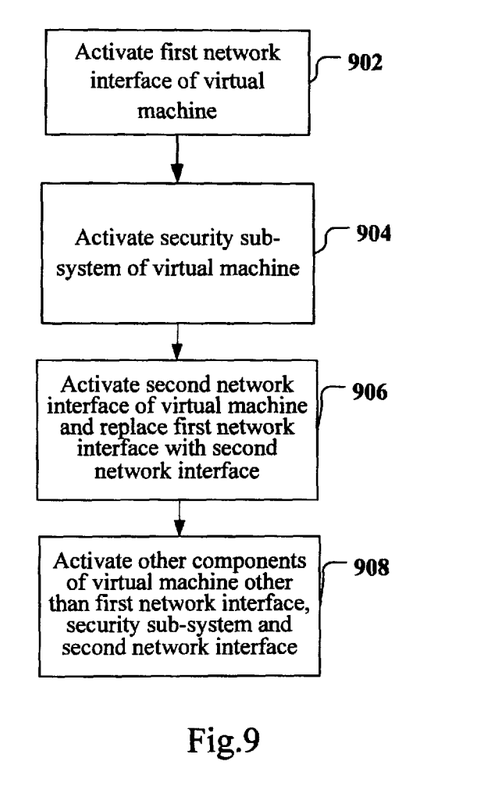
FIG. 9 is a flow chart of a method for activating a virtual machine according to a still further embodiment of the present invention.

FIG. 9 is a flow chart of a method for activating a virtual machine in accordance with another embodiment of the present invention. In FIG. 9, steps 902, 904 and 908 are similar to steps 702, 704 and 708 in FIG. 7 and therefore redundant description thereof is omitted here. In step 706, the first network interface of the virtual machine is replaced with the second network interface of the virtual machine after the second network interface of the virtual machine is activated, that is, the second network interface of the virtual machine is responsible for the communication related to the supervision of activation of the virtual machine.

An embodiment of the present invention further provides an apparatus for simulating a computing device. A virtual machine in the prior art is also an apparatus for simulating a computing device. The same components and functions in the apparatus for simulating a computing device according to the embodiment of the present invention as the virtual machine in the prior art will not be detailed below, and this embodiment of the present invention can be implemented by those skilled in the art upon review of the description in this specification.

Figure 10:
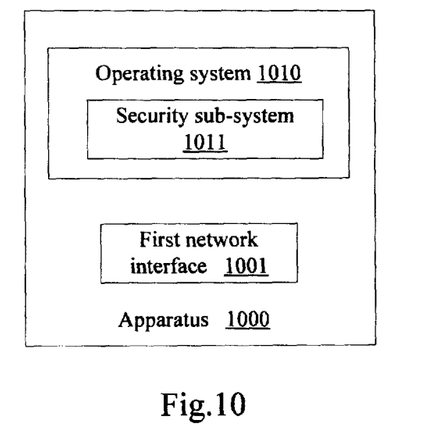
FIG. 10 illustrates an apparatus for simulating a computing device according to an embodiment of the present invention.

FIG. 10 illustrates an apparatus 1000 for simulating a computing device according to an embodiment of the present invention. The apparatus 1000 includes a first network interface 1001 and an operating system 1010 which includes a security sub-system 1011 with an authentication and verification mechanism for guaranteeing the security of the communication. This is well known to those skilled in the art and therefore will not be detailed here. The first network interface 1001 is configured to be firstly activated during activation of the apparatus 1000 so that the first network interface 1001 can communicate with the outside of the apparatus 1000 so that activation of the other components of the apparatus can be supervised during activation of the other components of the apparatus 1000. In an embodiment, the first network interface 1001 is configured to transmit information during activation to the outside of the apparatus 1000 and/or to receive information required for activation from the outside of the apparatus 1000. Since the first network interface 1001 is activated before the security sub-system 1011, the first network interface 1001 is limited to communication with only one or several trustable devices, e.g., a device for supervising activation of the apparatus 1000, for security in an embodiment. In an embodiment, the first network interface 1001 is reconfigured after the security sub-system 1011 is activated so as to cancel the limitation to communication with only the trustable devices. In an embodiment, the first network interface 1001 is configured to be disabled after the other components are activated.

Reference can also be made to the foregoing description of the embodiments of the present invention with reference to FIG. 5, FIG. 6 and FIG. 8 for details of operations and functions of the respective components of the apparatus 1000, and redundant description thereof is omitted here.

Figure 11:
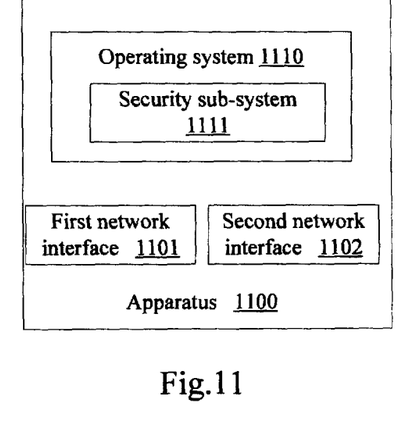
FIG. 11 illustrates an apparatus for simulating a computing device according to another embodiment of the present invention.

FIG. 11 illustrates an apparatus 1100 for simulating a computing device according to another embodiment of the present invention. The apparatus 1100 includes a first network interface 1101, a second network interface 1102 and an operating system 1110 which includes a security sub-system 1111. The first network interface 1101 and the security sub-system 1111 in the apparatus 1100 are similar to the first network interface 1001 and the security sub-system 1011 in the apparatus 1000 and therefore redundant description thereof is omitted here. The second network interface 1102 is configured to be activated after the security sub-system 1111 is activated. In an embodiment, the second network interface 1102 is configured to replace a function of the first network interface 1101 after the second network interface 1102 is activated.

Reference can also be made to the foregoing description of the embodiments of the present invention with reference to FIG. 7 and FIG. 9 for details of operations and functions of the respective components of the apparatus 1100, and redundant description thereof is omitted here.

Figure 12:
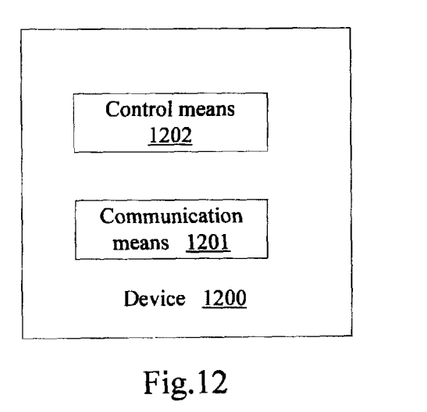
FIG. 12 illustrates a device for supervising activation of a apparatus for simulating a computing device according to an embodiment of the present invention.

FIG. 12 illustrates a device 1200 for supervising activation of the apparatus for simulating a computing device as illustrated in FIG. 10 and FIG. 11 according to an embodiment of the present invention. The device 1200 includes a communication means 1201 and a control means 1202. The communication means 1201 is configured to communicate with the apparatus for simulating a computing device during activation of the apparatus. The control means 1202 is configured to transmit information required for activation to the apparatus for simulating a computing device and/or to receive information during activation from the apparatus for simulating a computing device through a communication means.

Reference can also be made to the foregoing description of the embodiments of the present invention with reference to FIG. 7 and FIG. 9 for details of operations and functions of the respective components of the device 1200, and redundant description thereof is omitted here.

Figure 13:
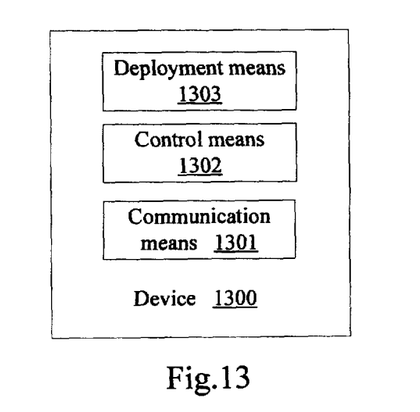
FIG. 13 illustrates a device for supervising activation of a apparatus for simulating a computing device according to another embodiment of the present invention.

FIG. 13 illustrates a device 1300 for supervising activation of the apparatus for simulating a computing device as illustrated in FIG. 10 and FIG. 11 according to an embodiment of the present invention. The device 1300 includes a communication means 1301, a control means 1302 and a deployment means 1303. The communication means 1301 and the control means 1302 are similar to the communication means 1201 and the control means 1202 in FIG. 12 and therefore redundant description thereof is omitted here. The deployment means 1303 is configured to deploy the apparatus for simulating a computing device.

Those ordinarily skilled in the art can appreciate that all or any of the steps or components of the methods and devices according to the present invention can be implemented in hardware, firmware, software or a combination thereof in any computing device (including a processor, a storage medium, etc.) or a network of computing devices, and this can be put into practice by those ordinarily skilled in the art with use of their general programming skills upon review of the description of the present invention and therefore redundant description thereof is omitted here.

Thus as can be seen from the above, the object of the present invention can also be achieved with a program or a set of programs being run on any information processing device, which can be a well-known general device. Therefore, the object of the present invention can also be achieved only with a program product which provides program codes for implementing the invented methods or devices. That is, both such a program product and a storage medium in which the program product is stored will fall within the scope of the present invention. Evidently, the storage medium can be any storage medium well-known or to be developed, and therefore it is not necessary to enumerate each of the storage mediums here.

The respective components or steps can be decomposed, combined and/or decomposed and recombined in the invented devices and methods. These decompositions, combinations and/or recombination shall be deemed as equivalent schemes of the present invention.

The foregoing description is only illustrative of the preferred embodiments of the present invention. Those of ordinary skill in the art will appreciate that the scope of the present invention will not be limited to the specific details disclosed here and various variations and alternatives are possible without departing from the spirit and scope of the present invention.

What is claimed is:

1. A method for activating a virtual machine, comprising the steps of:
    activating a first network interface of the virtual machine;
    activating other components of the virtual machine, wherein the other components comprise a virtual hardware, an operating system, a middleware, and an application program;
    configuring the first network interface of the virtual machine to communicate with a supervising device located outside of the virtual machine, the supervising device configuring the first network interface based on a physical interface identifier; and
    supervising activation of the other components of the virtual machine using the supervising device,
    wherein the virtual machine is an environment having a plurality of separate operating systems that run in parallel; and
    wherein at least one of the steps is carried out using a computer device.

2. The method according to claim 1, wherein the step of activating other components of the virtual machine includes the steps of:
    activating a security sub-system of the virtual machine; and
    activating a second network interface of the virtual machine after the security sub-system of the virtual machine is activated.

3. The method according to claim 1, wherein the first network interface is used to perform at least one of the steps of:
    transmitting information outside of the virtual machine during the activation of the virtual machine; and
    receiving information from outside of the virtual machine for the activation of the virtual machine.

4. The method according to claim 3, wherein the step of activating the first network interface of the virtual machine includes limiting the first network interface of the virtual machine to communicate with only a trustable device.

5. The method according to claim 4, wherein:
    the step of activating other components of the virtual machine includes activating a security sub-system of the virtual machine; and
    the method further comprises the step of reconfiguring the first network interface after the security sub-system of the virtual machine is activated so as to cancel the limitation of the first network interface to communication with only the trustable device.

6. The method according to claim 2, further comprising the step of replacing a function of the first network interface of the virtual machine with the second network interface of the virtual machine after the second network interface of the virtual machine is activated.

7. The method according to claim 1, further comprising the step of disabling the first network interface after other components of the virtual machine are activated.

8. The method according to claim 4, wherein the trustable device comprises a device for supervising the activation of the virtual machine.

9. Simulation apparatus for simulating a computing device, comprising:
    an operating system having an security sub-system;
    a first network interface configured to:
        activate first during activation of the simulation apparatus, wherein the other components communicate outside of the simulation apparatus; and
    a supervision module located externally from the simulation apparatus to supervise activation of the components of the simulation apparatus based on a physical interface identifier during the activation of the other components of the apparatus,
    wherein the simulation apparatus is an environment having plurality of separately operating systems that run in parallel.

10. The simulation apparatus according to claim 9, further comprising a second network interface configured to be activated after activation of the security sub-system.

11. The simulation apparatus according to claim 9, wherein the first network interface is configured to do at least one of:
    transmit information outside of the simulation apparatus during the activation of the simulation apparatus; and
    receive information from outside of the simulation apparatus for the activation.

12. The simulation apparatus according to claim 9, wherein the first network interface is limited to communication with only a trustable device.

13. The simulation apparatus according to claim 12, wherein the first network interface is reconfigured after the security sub-system is activated to cancel the limitation of the first network interface to communication with only the trustable device.

14. The simulation apparatus according to claim 10, wherein the second network interface is configured to replace a function of the first network interface after the second network interface is activated.

15. The simulation apparatus according to claim 9, wherein the first network interface is configured to be disabled after the other components are activated.

16. The simulation apparatus according to claim 12, wherein the trustable device comprises a device for supervising the activation of the simulation apparatus.

17. A supervising device for supervising activation of a simulation apparatus according to claim 9, further comprising:
   communication means configured to communicate with the simulation apparatus during activation for simulating a computing device; and
   control means configured to do at least one of (i) transmit information to the simulation apparatus for the activation and (ii) receive information from the simulation apparatus through the communication means during the activation.

18. The supervising device according to claim 17, further comprising deployment means configured to deploy the supervising apparatus for simulating a computing device.

19. An article of manufacture tangibly embodying non-transitory computer readable instructions which, when implemented, cause a computer to carry out the steps of a method comprising:
   activating a first network interface of the virtual machine;
   activating other components of the virtual machine, wherein the other components comprise a virtual hardware, an operating system, a middleware, and an application program:
   configuring the first network interface of the virtual machine to communicate with a supervising device located outside of the virtual machine, the supervising device configuring the first network interface based on a physical interface identifier; and
   externally supervising activation machine of the other components of the virtual machine using the supervising device,
   wherein the virtual machine is an environment having a plurality of separate operating systems that run in parallel; and
   wherein at least one of the steps is carried out using a computer device.

* * * * *